United States Patent
Kondo

(10) Patent No.: US 6,827,644 B2
(45) Date of Patent: Dec. 7, 2004

(54) MAGIC GAME SYSTEM

(75) Inventor: Hiroshi Kondo, Tokyo (JP)

(73) Assignee: Tenyo Co. Ltd., Tokyo (JP)

( * ) Notice: Subject to any disclaimer, the term of this patent is extended or adjusted under 35 U.S.C. 154(b) by 145 days.

(21) Appl. No.: 09/947,408

(22) Filed: Sep. 7, 2001

(65) Prior Publication Data

US 2002/0052240 A1 May 2, 2002

(30) Foreign Application Priority Data

Sep. 11, 2000 (JP) ........................................ 2000-274372

(51) Int. Cl.$^7$ ................................................ A63F 9/24
(52) U.S. Cl. ............................................ 463/7; 463/42
(58) Field of Search .............................. 463/1, 7, 9, 15, 463/30–31, 37, 40–42

(56) References Cited

U.S. PATENT DOCUMENTS 4,260,385 A * 4/1981 Gulack ....................... 434/208
5,779,549 A * 7/1998 Walker et al. ................ 463/42
2002/0037767 A1 * 3/2002 Ebin ............................ 463/25

FOREIGN PATENT DOCUMENTS

JP          10-235030     * 9/1998     ............ A63J/21/00

* cited by examiner

Primary Examiner—Kim Nguyen
(74) Attorney, Agent, or Firm—Swidler Berlin Shereff Friedman, LLP

(57) ABSTRACT

A system is provided for distributing magic games from a web server via the internet, in which a game provider provides magic games from the web server, while a user communicates the magic games using a portable remote information terminal, whereby answers to questions asked in the magic games are outputted and displayed on the portable remote information terminal in the form of any of voice, graphics and characters or a combination of any two or more thereof, so that an audience can enjoy various types of magic games via the internet using the portable remote information terminal.

6 Claims, 6 Drawing Sheets

| | Initials | Sex | Year of Birth | Blood Type Determination |
|---|---|---|---|---|
| | 1 | 2 | 3 | 4 |
| KASHIRAMOJI (Initials) — K Line | Kado (Card) | Ki (Key) | Kushi (Comb) | Keitai (Portable) |
| SEIBETSU (Sex) — S Line | Saihu (Purse) | Shihei (Currency Note) | Sukejuru Techo (Schedule Memorandum) | Tokei® (Watch made by SEIKO (Trade Mark)) |
| TANJOBI (Year of Birth) — T Line | Tabako (Tobacco) | Chakka-dogu (Lighting Tool (Lighter)) | Tuka (Coin) | Teiki (Commuting Pass) |
| KETSUEKIHANTEI (Blood Type Determination) — H Line | Hankachi (Handkerchief) | Bizinesu Kado (Business Card (Name Card)) | Finga Ringu (Finger Ring) | Pen (Pen) |

Bizinesu Kado : Japanese KANA character in HA Line can be changed from [h] to [b] by attaching a voiced consonant mark.

Finga Ringu : Japanese KANA character of FI is indicated by a combination of "HU" and a small "I".

Pen : Japanese KANA character in HA Line can be changed from [h] to [p] by attaching a small circle.

FIG.2

MAGIC GAME SYSTEM

BACKGROUND OF THE INVENTION

1. Field of the Invention

The present invention relates to a magic game system with which a user can enjoy various types of magic games using a portable remote information terminal which uses the internet.

2. Description of the Related Art

Japanese Patent Unexamined Publication No. 10-235030 discloses a magic game apparatus invented by the applicant of this patent application as a conventionally known magic game apparatus. This conventional example is designed such that magic game data is recorded in a CD-ROM, and that answers to questions asked in a magic game are displayed on the screen of a personal computer while playing the magic game by loading the CD-ROM in the personal computer.

However, fixed data recorded on a CD-ROM as described above can, of course, be enjoyed as magic games but only on a specific terminal such as a personal computer, and with such fixed data it is not possible for a game provider to rewrite the game data to be distributed.

The present invention was made in view of the drawback inherent in the prior art example, and an object thereof is to provide a system in which a game provider distributes magic games from a web server so that a user can enjoy various types of magic games using a portable remote information terminal which makes use of the internet.

SUMMARY OF THE INVENTION

According to a first aspect of the present invention, there is provided a magic game system for distributing games from a web server via the internet, characterized in that a game provider provides magic games from a web server, while an audience communicates the magic games using a portable remote information terminal, wherein answers to questions asked in the magic games are outputted and displayed in the form of any of voice, graphics and characters or a combination of any two or more thereof. To be specific, this is represented as a phenomenon in which despite the fact that information on what is selected by the audience is not directly inputted into the Portable remote information terminal, the portable remote information terminal eventually makes a good guess at what is selected.

According to the first aspect of the present invention, the enjoyable magic game system can be provided in which the game provider provides the magic games from the sever, part or all of the game data of which can be rewritten for distribution, while the audience can be given an opportunity to enjoy the magic using the portable remote information terminal whenever and wherever they like.

When used in the present invention, the portable remote information terminal includes portable or mobile telephones, personal computers and various types of portable remote information terminals which are each provided with a communication function.

According to a second aspect of the present invention, there is provided a magic game system for distributing games from a web server via the internet, characterized in that a game provider provides magic games on a web server, and that when a user inputs the magic games using a portable remote information terminal, the results of processing implemented in accordance with programs prepared on the server in advance are outputted and displayed as answers to questions asked in the magic games on the portable remote information terminal in the form of any of voice, graphics and characters or a combination of any two or more thereof.

According to the second aspect of the present invention, the input work by the user is executed and processed in accordance with the programs on the server, and the results of the processing are outputted and displayed as the answers to the questions asked in the magic games on the portable remote information terminal.

According to a third aspect of the present invention, there is provided a magic game system as set forth in the second aspect of the invention, wherein what is selected by a playing partner is encoded and inputted as a code using a ten key keyboard or a keyboard of the portable remote information terminal, whereby answers to questions asked in the magic games are outputted and displayed on the portable remote information terminal in the form of any of voice, graphics and characters or a combination of any two or more thereof.

According to the third aspect of the present invention, the articles selected freely by the playing partner are encoded and inputted as codes using the ten key keyboard or keyboard on the portable remote information terminal, and the articles so selected by the playing partner can be outputted and displayed in the form of any of voice, graphics and characters or a combination of any two or more thereof. In this case, the person who inputs the codes may be either the player or audience.

According to a fourth aspect of the present invention, there is provided a magic game system as set forth in the second or third aspect of the invention, wherein the audience is asked to input data indifferent from what is selected in corresponding codes which are encoded using kinds, orders and combinations of the data through the portable remote information terminal, whereby what is selected is then outputted and displayed on the portable remote information terminal in the form of any of voice, graphics and characters or a combination of any two or more thereof.

According to the fourth aspect of the present invention, the player does not have to directly touch the portable remote information terminal, while the playing partner is asked to input the codes instead, and therefore the audience can feel stronger wonder at the magic.

According to a fifth aspect of the present invention, there is provided a magic game system as set forth in any of the second to the fourth aspects of the invention, wherein in a case where the playing partner is asked to freely choose an answer to a predetermined question from two or more choices and to input the result of the choice using the ten key keyboard or keyboard on the portable remote information terminal, different keys corresponding to the choice to be inputted are set as keys representing the same article on the program, so that despite the choice by the playing partner any input through the different keys results in a specific code, whereby the article selected by the playing partner is outputted and displayed on the portable remote information terminal in the form of any of voice, graphics and characters or a combination of any two or more thereof.

According to the fifth aspect of the present invention, despite the fact that the answer chosen by the playing partner using the ten key keyboard has no relation to what is selected by the playing partner, the designation of what is so selected is outputted and displayed on the portable remote information terminal.

According to a sixth aspect of the present invention, there is provided a magic game system as set forth in the second or third aspect of the invention, wherein a plurality of items graphically displayed on the portable remote information terminal are selected by pressing buttons on the portable remote information terminal in accordance with a predetermined story, whereby answers to questions asked in the magic games are outputted and displayed on the portable remote information terminal in the form of any of voice, graphics and characters or a combination of any two or more thereof.

According to the sixth aspect of the present invention, the order in which the buttons are pressed is controlled by the predetermined story, whereby required codes can be inputted by the playing partner without the fact being known to the playing partner.

According to a seventh aspect of the present invention, there is provided a magic game system as set forth in any of the first to sixth aspects of the invention, wherein the portable remote information terminal is a portable or mobile telephone.

According to the seventh aspect of the present invention, since the magic games can be enjoyed using the portable or mobile telephone, the player can show the magic games to the audience whenever and wherever he or she likes.

According to an eighth aspect of the present invention, there is provided a magic game system as set forth in any of the first to seventh aspects of the invention, wherein the user can receive answers to questions asked him or her in the magic games on his or her own portable remote information terminal in the form of electronic mails, or the answers can be transmitted in the form of electronic mails to portable remote information terminals of those other than the user.

According to the eighth aspect of the present invention, since the answers to the questions asked in the magic games can be transmitted in the form of electronic mails to the portable remote information terminal of the user or portable remote information terminals of those other than the user, more fun can be created than what is obtained when the answers are viewed only on the screen of the portable remote information terminal of the user.

BRIEF DESCRIPTION OF THE DRAWINGS

The invention will be better understood from reading the description which will follow, which is given merely by way of example and made with reference to the appended drawings, in which:

FIG. 2 shows codes for use in guessing selected articles in accordance with an embodiment of the present invention;

DESCRIPTION OF THE PREFERRED EMBODIMENTS

The present invention relates to a system for distributing magic games from a web server via the internet, in which a game provider provides magic games on the web server, while a user communicates the magic games using a portable remote information terminal, whereby answers to questions asked in the magic games are outputted and displayed on the portable remote information terminal in the form of voice, graphics or characters, or a combination of any two or more thereof.

Embodiments of the present invention will be described in detail below with reference to the appended drawings.

Figure 1:
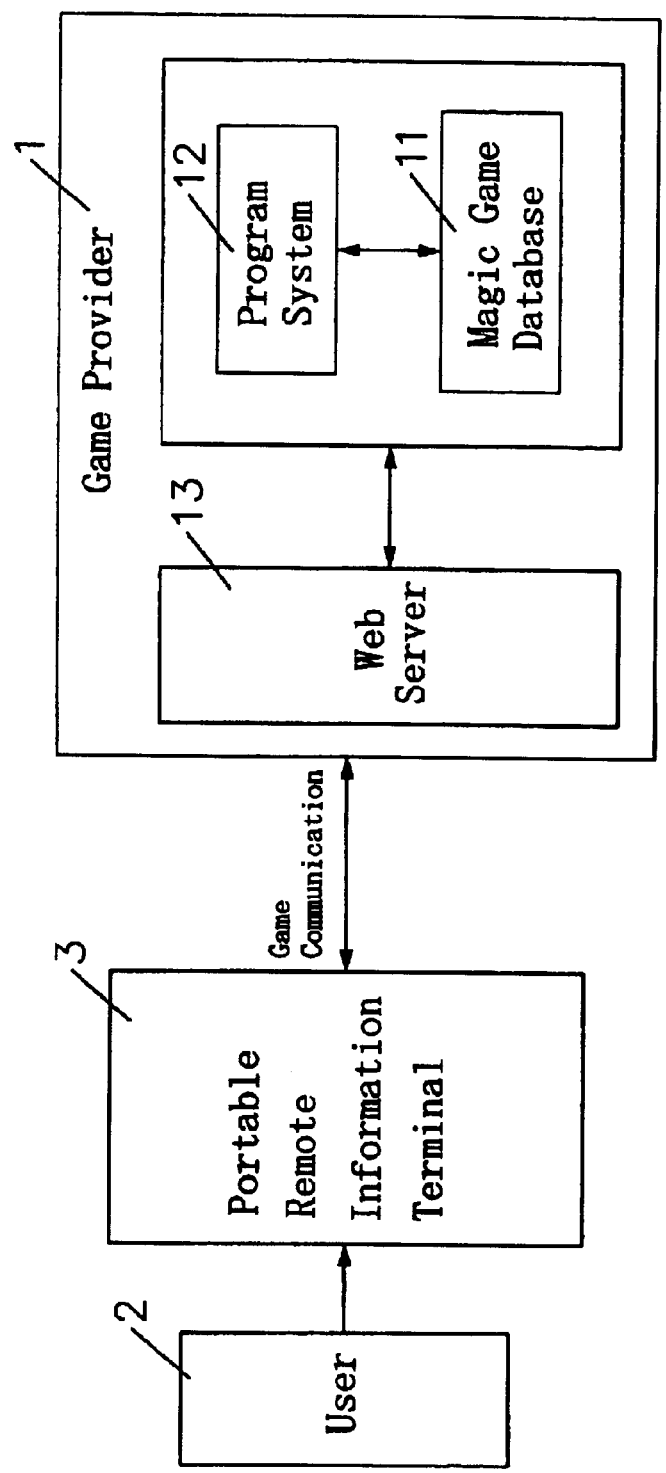
FIG. 1 is an overall system diagram of a system for providing magic games for use with the present invention.

FIG. 1 is an overall system diagram of a system for providing magic games for use with the present invention.

A game provider 1 constructs various types of magic games and responds to a portable remote information terminal 3 when receiving a request therefrom by controlling a program system 12 through an instruction signal from a web server 13 in response to the request so received from the portable remote information terminal 3, example, in case the instruction signal request graphic data, reading out graphic data so requested from a magic game database 11 via the program system 12 and transmitting the data so read out from the web server 13 to the portable remote information terminal 3 via the program system 12. A user 2 accesses the web server 13 of the game provider and communicates the magic games using the portable remote information terminal 3. In communicating the games, the user 2 operates the keys on the portable remote information terminal 3, whereby answers to questions asked in the magic games are transmitted to the portable remote information terminal 3 from the web server 13 in the form of graphics, characters or voice. An electronic mail transmission may be used for transmission to the portable remote information terminal.

Firstly, a simplest embodiment will be described in which a portable remote information terminal is used for showing magic using the portable remote information terminal.

Messages as below are displayed on the screen of the portable remote information terminal sequentially, and what the user has to do is only to follow commands given by the messages, whereby the portable remote information terminals guesses what the user bears in his or her mind.

"Think of one number you like from 1 to 10."

"Double the number."

"Add 4 to the answer."

"Divide the answer by 2."

"Subtract the number you initially thought of from the answer."

"Bear the answer in your mind firmly."

"It is 2, isn't it?"

Whichever number the user may think of from 1 to 10, calculations to be implemented on the number a by the user are expressed by the following expression, and an answer of the expression becomes always 2.

$$(ax\ 2+4)/2-a=(a+2)-a=2$$

This magic consists of only the simple mathematical expression, and therefore when it is played repeatedly, the user comes to know that there exists only one answer. To cope with this, in the following embodiment, an example will be described in which answers to questions asked are always different.

In the following description, it is premised that what is referred to as player is a person who understands the system of another magic game and how to operate the game and presents the magic game using the portable remote information terminal, while the audience does not understand the system.

This embodiment illustrates the magic game requiring the player to input simple codes. For example, put a "key," a "coin," and a "watch" on a table, and let the audience choose whatever the audience likes among the tree articles. Here, assume that the audience chooses the "coin." The three articles are encoded and programmed on the magic game database 11 as shown in Table 1.

TABLE 1

| 1 | Key |
|---|---|
| 2 | Coin |
| 3 | Watch |

The player takes out the portable remote information terminal 3 such as a portable telephone and announces that the web side 13, which is a site for magic games, is invoked, but in fact the player has already invoked the server 13 and inputs the code 2 for the coin which has been selected by the audience using the ten key keyboard for transmission to the web server 13. The program system 12 is controlled by the instruction signal "2" received by the web server 13 in response to the request received from the portable telephone, character data is read out of the magic game database 11, and the character data so read out is then transmitted to the portable telephone 3 from the web server 13. Then, it is designed in advance that a title word, "prophecy," and a button stating a sentence, "Read the prophecy" are displayed on the screen so that it looks as if a real magic site were invoked. Then, the player hands over the portable telephone 3 to his or her playing partner and asks the partner to depress the "Read the prophecy" button. It is designed in advance that depressing the button displays in characters "What you select is coin" on the screen, whereby the player partner feels wonder at the magic. In addition, if the number of articles that the playing partner can select is increased, wonder that the playing partner can feel can be increased.

The following embodiment is developed from the aforesaid embodiment so as to guess more articles. A magic game in this embodiment is configured as follows. The audience is asked to take out one of articles he or she has in the pockets or wears and to put it on the table. Then, let the audience hold the portable telephone and ask the audience to input for transmission his or her personal data such as blood type, whereby a picture illustrating the article that the audience selects is displayed in graphics on the screen of the portable telephone.

FIG. 2 is a table of codes for use in a further embodiment of the present invention.

Data that is to be inputted by the audience is any of his or her initials, sex, birthday, and blood type or a combination of any two of them, whereby sixteen articles shown in FIG. 2 can be defined. To ease memorization of the articles by the player, the sixteen articles are represented using first four KANA characters of KA, SA, TA and HA lines of the Japanese KANA characters system. In addition, the player memorizes data designating the respective lines in such a way: "KA"SHIRAMOJI (a Japanese word meaning initials) for the KA line, "SE"IBETSU (a Japanese word meaning sex) for the SA line, "TA"NJOBI (a Japanese word meaning birthday) for the TA line, and KETSUEKI "HA"NTEI (Japanese words meaning blood type determination) for the HA line. Furthermore, the player memorizes for each data an order representing the arrangement of the first four KANA characters for each line in such a way: 1 (a personal name that exists only one (1)); 2 (sexes that exist two (2)); 3 (three (3) designations of Japanese historical eras such as TAISHO, SHOWA and HEISEI); and 4 (four (4) blood types).

In this method, since the player initially operates the portable telephone 3, it is inevitable that the audience doubts that the player must have inputted information in secret.

To cope with this, in order to enhance the wonder of magic, there is a method in which only the playing partner is allowed to operate the portable telephone 3, but the playing partner is forced to input required codes without being aware of the fact. This embodiment provides a method in which the playing partner is allowed to hold the portable telephone from the beginning to input codes.

TABLE 2

Key (to be inputted in English)
Coin (to be inputted in Japanese KANA characters)
Watch (to be inputted in numbers)

As shown in Table 2, a method for inputting a code is determined in advance for each article, and let the playing partner choose freely any of the articles. Then, the following questions are asked for the respective articles: "Can you input your initials?" for the "Key," "Can you input your name in Japanese KANA characters?" for the "Coin," and "Can you input your birthday in numbers?" According to this method, irrespective of what is inputted by the playing partner, the types of inputting constitute the codes, and therefore the article that the playing partner selects can be specified. For example, it is programmed such that in a case where the playing partner selects the "Watch," even if any birthday is inputted in numbers such as "131," or "1212," as long as numbers are inputted, it is defined that the playing partner has selected the watch. To create a feel of magic, the following message is designed to be displayed in characters on the screen of the portable telephone; "Well, now that you were born on December 12, what you have selected must be the watch." Thus, a message like this can make the playing partner feel that what he or she has inputted is meaningful. When viewed from the playing partner, the article he or she has selected has no relation to his or her birthday, and therefore the playing partner feels wonder at the fact that what he or she has selected has been guessed.

To ease the operation by the audience, it is designed that all inputs can be made using alphabets as input character. Namely, the initials are designated by two characters, the sex by M or W, the birthday by any of T, S and H for TAISHO, SHOWA and HEISEI, respectively, and the blood type by any of A, B, AB and O.

The magic will be played as follows. Firstly, think in which line an article the playing partner has selected exists. For example, in a case where what has been selected is HANKACHI (a Japanese word for handkerchief), HANKACHI is an article existing in the HA line, and therefore, ask the playing partner to input his or her blood type in alphabet or alphabets. After the input has been completed, the cursor is then moved so as to provide a space equal to the size of a character for preparation for the next input. The "HA" of HANKACHI comes first in the arrangement of characters of "HA, HI, HU, HE" and therefore initials representing 1 are then made to be inputted in two alphabets. As this occurs, for example, "A HK" is displayed on the screen of the portable telephone. When this is transmitted, the handkerchief which has been programmed in advance can be specified from the code, and a picture illustrating the handkerchief can be transmitted to the portable telephone together with a message stating, "what is selected by a person whose blood type and initials are Type A and HK, respectively, is."

In addition, for an article such as a currency note in which the same sex data intersects with each other vertically and horizontally, only the sex has to be inputted. The program system 12 on the web server side is programmed so as to determine that the initials are designated by two alphabets, the sex by a single character of M or W, the birth year by a single character of T, S or H, and the blood type by a single character of A, B or O.

In addition, three or more characters can be inputted continuously by inputting the sex directly following the initials without no space being provided after the initials, or three or more characters can be inputted with a space being provided between the initials and sex, whereby many more articles can be displayed to be guessed.

This embodiment provides a magic game in which articles to be guessed are encoded so as to be registered on the database 11, and while data indifferent from an article to be guessed is being inputted by the audience, a code for the article is transmitted to the portable telephone 3 from the web server 13 by type, order or combination of the data without knowing, and as a result, the designation or image of the relevant article is specified via the server and displayed on the portable telephone. There are many things other than those illustrated in this embodiment such as Telephone numbers and constellations which can be raised as data to be inputted.

The following embodiment relates to a method for inducing the audience to input codes without knowing for a magic game for guessing an article that the audience freely selects.

In this embodiment, firstly, the web server is accessed using the portable telephone 3. The portable telephone is handed over to the audience, and the player asks the audience to freely name one card (by mark and number). The player prepares five questions in advance, and asks the audience three questions out of those five questions. For example, the player asks the audience a question like, "which do you like better, carrot or cucumber?" and afterwards asks the audience to proceed with the game by asking, "if you like better carrot, depress "2" on the ten key keyboard, and on the contrary, if you like better cucumber, then depress "9."" Thus, three questions are asked sequentially, and in the three questions, the audience is induced to freely choose three numbers which are phonetically related to the articles and then to depress a transmission button. There can be no relation between the answer made and the card selected by the audience, but the selected card is displayed in graphics on the portable telephone 3. In this embodiment, selected cards are designed to be specified by the type and order of questions asked. While alternative questions are designed to be asked, it is programmed such that the same number is inputted despite the fact that the audience inputs either of the pairs of numbers in practice. Then, as shown in Table 3, ten items are proposed to cover the ten keys 0 to 9 on the ten key keyboard, respectively.

TABLE 3

| | | (Ten Keys) |
|---|---|---|
| 1 | Ichigo Jam (Strawberry Jam) | 1 (Ichi) |
| | Hachimitsu (Honey) | 8 (Hachi) |
| 2 | Ninjin (Carrot) | 2 (Ni) |
| | Kyuri (Cucumber) | 9 (Kyu) |
| 3 | Mikan (Mandarin Orange) | 3 (Mittsu) |
| | Remon (Lemon) | 0 (Rei) |
| 4 | Shinfoni (Symphony) | 4 (Shi) |
| | Rokku (Rock) | 6 (Roku) |
| 5 | Goruden Week (Golden Week) | 5 (Go) |
| | Natsuyasumi (Summer Vacation) | 7 (Nana) |

The following questions are prepared. For Question No. 1, "Which do you like better Ichigo Jam (strawberry jam) or Hachimitsu (honey)?" The audience is induced to depress 1 or 8 on the ten key keyboard. In this case, it is programmed such that 1 is inputted whichever number may be depressed. For Question No. 2, "Which do you like better Ninjin (carrot) or Kyuri (cucumber)?" The audience is induced to depress 2 or 9 on the ten key keyboard, and it is also programmed such that 2 is inputted whichever number may be depressed. For Question No. 3, "Which do you like better Mikan (mandarin) or Orenji (orange) or Remon (lemon)?" The audience is induced to depress 3 or 0 on the ten key keyboard and 3 is inputted whichever number may be depressed. Fog Question No. 4, "Which do you like better Shinfoni (symphony) or Rokku (rock)?" The audience is induced to depress 4 or 6. It is programmed such that 4 is inputted whichever number is depressed. For Question No. 3, "Which do you like better Goruden week (Golden Week) or Natsuyasmumi (summer vacation)?" The audience is induced to depress 5 or 7. However, 5 is inputted whichever number may be depressed. Table 4 is a table of codes for specifying one card out of fifty-two cards using the system described above.

TABLE 4

| | | ● → | | | | |
|---|---|---|---|---|---|---|
| ● | | 1 | 2 | 3 | 4 | 5 |
| ↓ | 1 | A | 2 | 3 | 4 | 5 |
| | 2 | 6 | 7 | 8 | 9 | 10 |
| | 3 | J | Q | K | | |
| ● → | | | | | | |
| | 1 | | 2 | 3 | | 4 |
| | Diamond | | Club | Heart | | Spade |

Table 4 is viewed as follows. ●●● denotes orders in which questions are asked, and numbers arranged in directions indicated by arrows denote orders in which questions are asked. Table 3 and Table 4 are written down on a memorandum.

Ask the audience to name a card whichever he or she likes. Here, assume that the audience names the "6 of Heart." The player takes out the memorandum while saying, "Now, let's do a magic while asking you about your favorites," and asks the audience the questions written down on the memorandum with no one else being allowed to look at it.

Firstly, looking at Table 4, confirm in which column 6 is located in directions indicated by the combinations of dots and arrows. Numbers from 1 to 5 correspond to five kinds of questions, respectively. In this case, since 6 is located in Column 1, Question No. 1 on Table 3 is asked; "Which do you like better Ichigo Jam (strawberry jam) or Hachimitsu (honey)?" Only 1 is allowed to be inputted whichever the audience may choose. This limits the number of the card selected by the audience to any of A, 6 and J. Since the question that has been asked once cannot be repeatedly asked, the first "Ichigo Jam (strawberry)—Hachimitsu (honey)" question should be deleted from Table 3 in mind, the order of asking the questions should be pulled forward.

Next, looking at Table 4, the player confirms in which place the mark of the card selected by the playing partner is located. Numbers from 1 to 4 correspond to the remaining four types of questions, respectively. Since Heart is located in the third place, the third "Shinfoni (symphony)—Rokku (rock)" question of the remaining four questions is asked. It is programmed such that only 3 is inputted whichever number the audience may choose. This determines that the mark of the card that the playing partner has chosen is Heart. Similarly to the case in which after having been asked, the first "Ichigo Jam (strawberry)—Hachimitsu (honey)" question is deleted, the fourth "Shinfoni (symphony)—Rokku (rock)" question is deleted in mind.

A last question is asked to identify the number of the card that the playing partner has chosen. The player observes in which row the number is located in directions indicated by the combinations of dots and arrows. Numbers 1 to 3 correspond to the remaining three types of questions. Since the number 6 is located in the second row, the second "Mikan (mandarin orange)—Remon (lemon)" question of the remaining questions on Table 3 is asked. As has been described before, since the "Ichigo Jam (strawberry)—Hachimitsu (honey)" question was deleted after the first question had been asked, in the order of asking questions on Table 3 the "Mikan (mandarin orange)—Remon (lemon)" question is pulled forward from "3" to "2." It is programmed such that only 2 is inputted whichever number the playing partner may choose. This last question determines that the number that the playing partner has chosen is 6 in the second group among A, 6, and J, whereby the "6 of Heart" is identified.

Here, while showing the tree numbers that have been inputted by the audience, the player says as if it were true, "If you had chosen a different card, the numbers would have been different." Thereafter, the player asks the audience to move the cursor and to transmit the numbers so inputted by the audience. Thus, the program system 12 is controlled by an instruction signal transmitted to the web server 13, graphic data is read out of the magic game database 11 via the program system 12 and the graphic data so read out is then transmitted to the portable telephone 3 from the web server 13, whereby the "6 of Heart" is displayed on the screen of the portable telephone 3 in graphics as a result of the responding process.

In this embodiment, while the example is described in which the numeric ten key keyboard is used, it may be possible that the ten key keyboard on the portable telephone is set for alphabet inputs so that required words can be inputted using first letters thereof. For example, assume that a question is asked: "Which do you like better APPLE or PINEAPPLE?" With a question like this, it is possible to ask a question using English words. In addition, questions to be asked are not limited to alternative questions but questions may be asked which requires one article out of three or four articles provided that it is programmed such that the same article is intended to be meant even if any of buttons is depressed. This method is effective when using a keyboard having a number of keys to be depressed.

Next, a method will be described in which codes are inputted using graphics while the audience is given no knowledge thereof.

Figure 3:
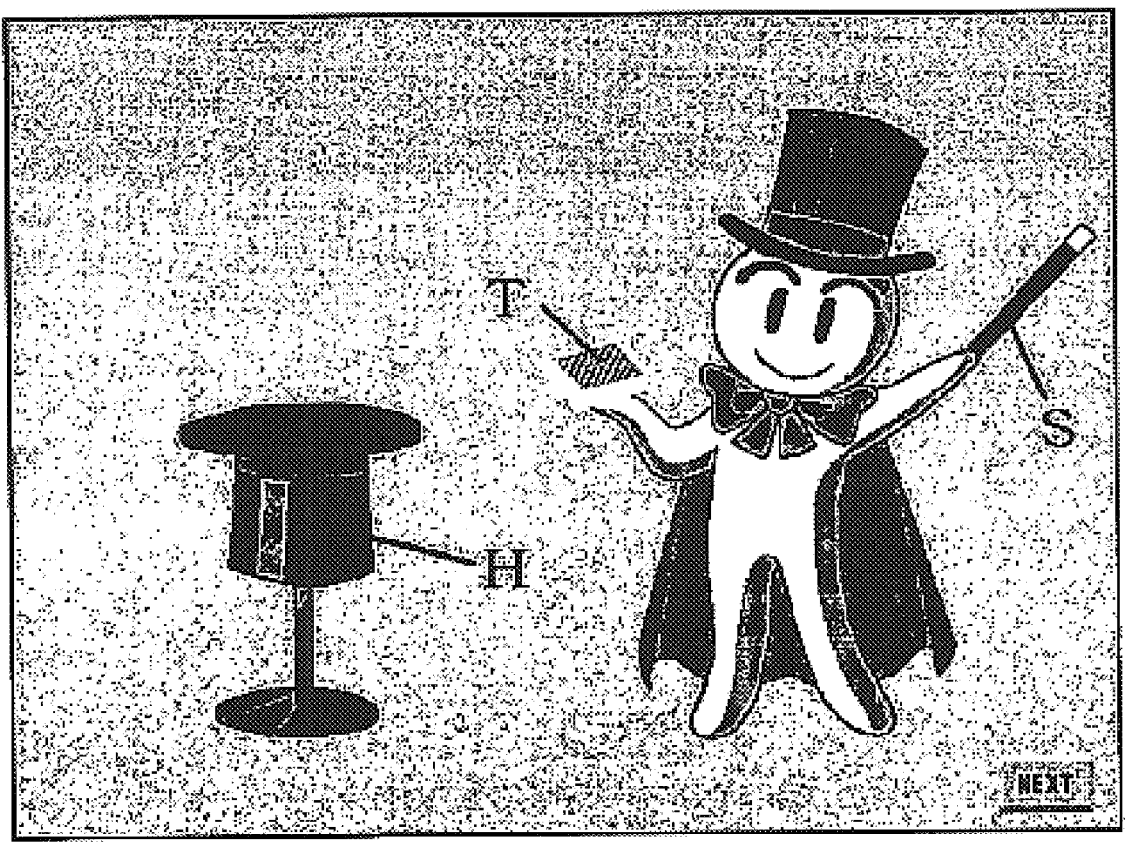
FIG. 3 is an example of a game screen for use with the present invention.

In this embodiment, when the web server 13 is accessed using the portable telephone 3, a game screen as shown in FIG. 3 comes to appear, on which a hat H is displayed as being put on a pedestal on the left-hand side of the screen, a pack of cars T as being placed on the palm of a magician, and a stick S as being held in the left hand of the magician, and in addition, a "Next" button is displayed on the same screen. Buttons corresponding to the respective articles are disposed. Every time the audience depresses a Move button on the portable telephone 3, a cursor is moved sequentially, and the selection of the article is completed by finally depressing the specific button. According to the contents of a magic game of this embodiment, the audience is asked to freely tell the mark and number of a card, and the mark and number of the card so told is guessed and displayed in graphics.

To describe the contents of the magic game more specifically, the player speaks differently depending upon a card selected by the audience, whereby the button that is to be depressed by the audience is defined, and moreover, as a result of this, it is programmed such that an image that matches the depressed button is displayed. Namely, according to the embodiment, the order in which the buttons are depressed is controlled by a story told by the player, so that required codes are inputted while the audience is given a knowledge thereof.

Firstly, the audience is asked to depress the buttons as follows depending upon the mark of a card that he or she has chosen. In a case where the audience chooses the diamond as the mark of a card, the player induces the audience to depress the "Card" button, while discoursing, "Let's guess a card you have chosen from a set of cards shown on the screen." When the audience depresses the "Card" button, the screen is changed to another screen on which an image is displayed of cards flying continuously into the hat H. In a case where the audience chooses the club as the mark of a card, the player induces the audience to depress the "Stick" button, while discoursing, "I'll show you a magic from now. To make myself do so, I am using this magic stick." When the audience depresses the "Stick" button, an image is displayed of the magician moving the stick to charm the cards, which then fly into the hat. In a case where the audience chooses the heart, the player induces the audience to depress the "hat" button while mentioning, "There exists in the hat H an assistant who can assist in showing the magic." When the audience depresses the "Hat" button, an image is displayed of a rabbit coming out of the hat to receive the cards and then going back into the hat. Then, when the audience chooses the spade, the player induces the audience to depress the "NEXT" button, while mentioning, "I'll show you a magic. Firstly, please depress the NEXT button." When the audience depresses the NEXT button, an image is displayed of the cards flying into the hat.

Thus, the player changes the lines of speech depending upon the mark of a card that the audience chooses, whereby the audience is induced to depress the specific button of the four buttons so as to give an instruction signal to the web server 13 to thereby specify the mark of the card on the program system 12.

Figure 4:
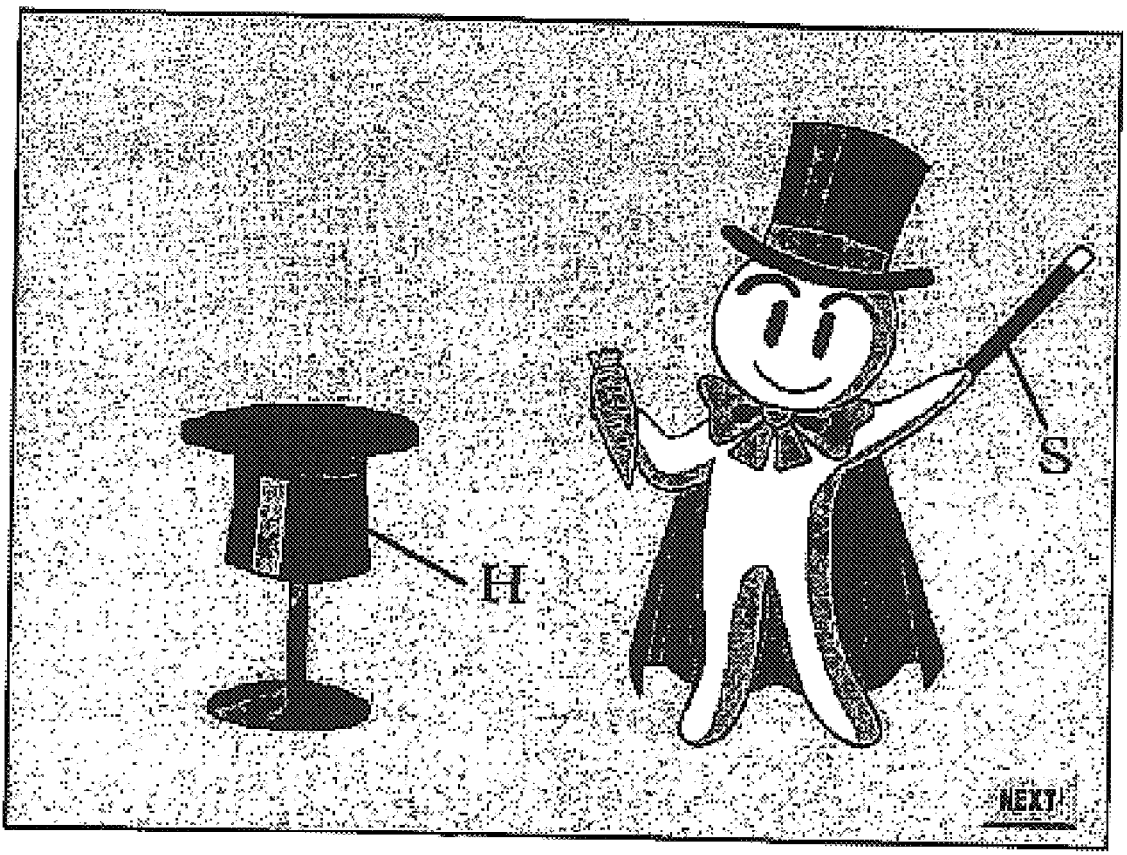
FIG. 4 is another example of a game screen for use with the present invention.

In any of the above cases, although the different items start to move when the different buttons are depressed, there is always displayed the animation of the cards entering the hat at the end. FIG. 4 illustrates a screen on which the last scene of the animation is shown in which a carrot appears which is held in the hand of the magician.

Next, the number of the card that the playing partner has chosen by imparting a signal to the program system. For the sake of explanation, the ace is represented as 1, the Jack as 11, the Queen as 12 and the King as 13. Firstly, in a case where the audience has chosen a number from 1 to 4, the player induces the audience to depress the "Carrot" button, while saying, "Let's give a prize to the assistant who assists in doing the magic." In a case where the audience depresses the "Carrot" button, an image is displayed of the magician starting to shake the carrot with the rabbit coming out of the hat to receive the carrot. In a case where the audience has chosen a number from 5 to 8, the player induces the audience to depress the "Stick" button, while discoursing, "Let's give the carrot to the assistant who assists in doing the magic. To do that, I'll use this magic stick." When the audience depresses the "Stick" button, an image is displayed of the magician sticking the carrot with the stick and waving the stick with the carrot over the hat with the rabbit coming out of the hat to receive the carrot. In a case where the audience has chosen a number from 9 to 12, the player induces the audience to depress the "Hat" button, while mentioning, "Next, let's call the assistant who assists in doing the magic from the hat." When the audience depresses the "Hat"

button, an image is displayed of the rabbit coming out of the hat to receive the carrot.

Figure 5:
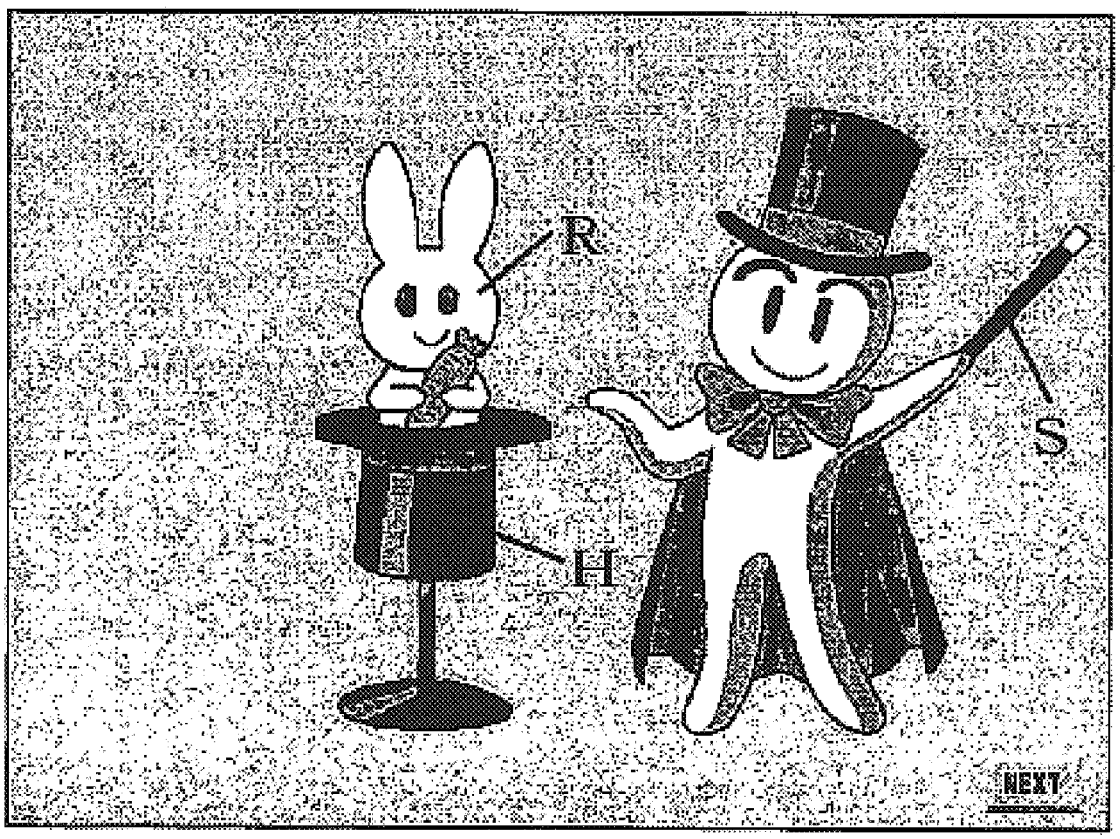
FIG. 5 is a further example of a game screen for use with the present invention.

In any the above cases, although when the different buttons are depressed the different items start to move, there is always displayed the animation of the rabbit coming out of the hat to grab the carrot at the end. FIG. 5 illustrates a screen showing the last scene of the animation. Thus, the number of the cart that the audience has chosen can be limited to four numbers through the above operations.

Figure 6:
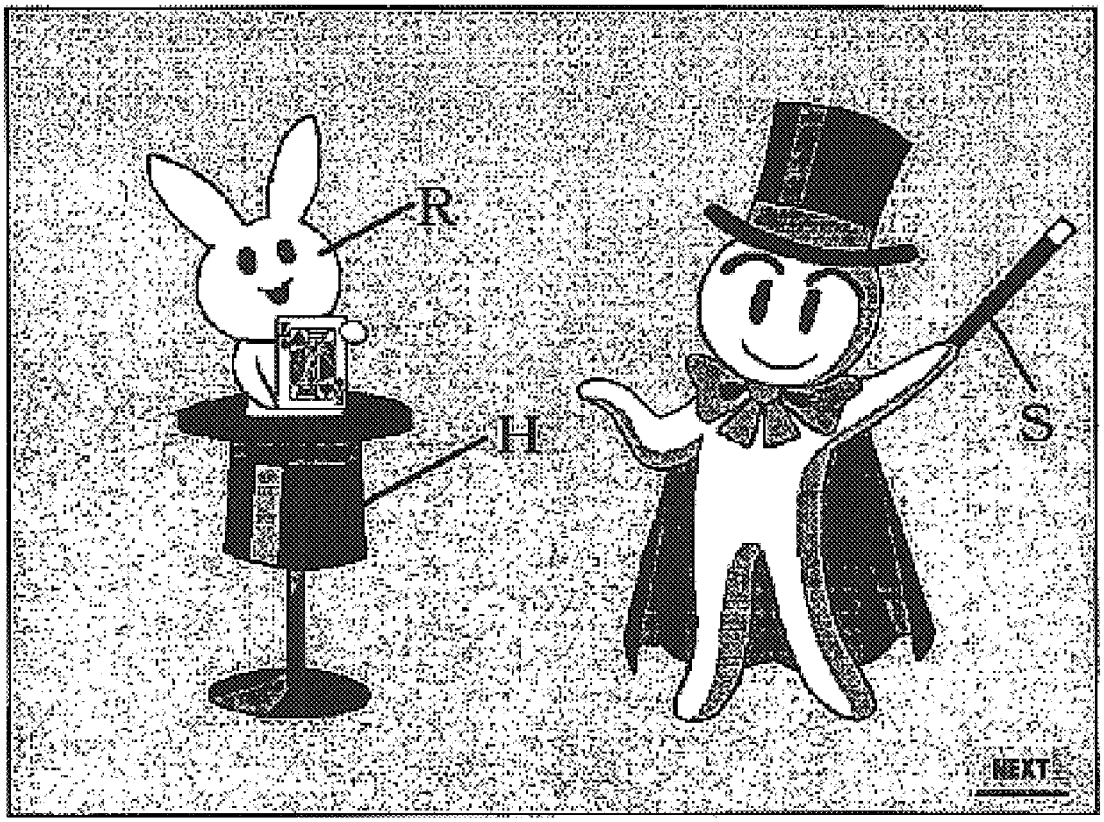
FIG. 6 is a still further example of a game screen for use with the present invention.

In addition, in a case where the audience has chosen 13, the player induces the audience to depress the "NEXT" button, while discoursing, "This is final. Please depress the NEXT button." When the audience depresses the "NEXT" button, since the number is determined, the rabbit comes out of the hat to receive the carrot and then goes back into the hat to fetch the card that the playing partner has chosen, as shown in FIG. 6 which shows the last scene of the magic game.

Finally, the number of the card chosen by the playing partner which is now limited to four numbers is determined as follows. In a case where the numbers that the audience has chosen are 1, 5 and 9, the player induces the audience to depress the rabbit button, while saying, "Let's the rabbit guess the card." When the audience depresses the "rabbit" button, an image is displayed of the rabbit entering the hat and then coming out of the hat with the card selected by the playing partner. In a case where the numbers that the playing partner has chosen are 2, 6 and 10, the player induces the audience to depress the "Stick" button, while mentioning, "The rabbit will eventually guess the card that you have chosen. Then, I'll use this magic stick." When the playing partner depresses the "Stick" button, an image is displayed of the magician pushing the rabbit into the hat by pushing the head of the rabbit with the stick with the rabbit coming out of the hat with the card that the playing partner has chosen in its hands afterwards. In a case where the numbers that the playing partner has chosen are 3, 7 and 11, the player induces the audience to depress the "Hat" button, while saying, "Let's the rabbit choose a card from the cards in the hat." When the playing partner depresses the "Hat" button, an image is displayed of the hat moving the mouth and taking the rabbit down thereinto and the rabbit coming out of the hat with the card in its hands. In a case where the numbers that the playing partner has chosen are 4, 8 and 12, the player induces the playing partner to depress the "NEXT" button, while discoursing, "Now, this is final. Please depress the "NEXT" button." When the audience depresses the "NEXT" button, an image is displayed of the rabbit entering the hat and then emerging from the hat with the card that the playing partner has chosen in its hands. In any of the above cases, although when the different buttons are depressed the different items start to move, the rabbit eventually enters the hat to fetch the card that the playing partner has chosen as shown in FIG. 6.

In all the embodiments, while the displays displayed in the course of guessing what is chosen by the audience are described as being displayed only on the screen of the portable telephone, the present invention is not limited thereto. For example, when the portable telephone is used, a call may be received by the portable telephone so that the card that the audience has chosen can be guessed while the audience is allowed to listen to voice recorded on the server in advance. Alternately, displays in characters or graphics may be sent by electronic mail. In any of the cases, to make the audience feel the wonder of magic, more fun can be represented thereby than what is obtained by only the images displayed on the screen.

The present invention is implemented as has been described heretofore and provides the following advantages.

According to the present invention, since the game provider provides the magic games on the server, there is provided the enjoyable magic game system in which the provider can rewrite part or all of the game data and provide the data so rewritten, while the user can show the magic games to the audience whenever and wherever the use likes using the portable remote information terminal.

According to the present invention, the game input work by the user is executed and processed in accordance with the program on the server, and the result of processing is outputted and displayed on the portable remote information terminal as answers to questions asked in the magic games.

In addition, according to the present invention, what is chosen freely by the playing partner is inputted in the form of codes through the ten key keyboard or the keyboard on the portable remote information terminal, and what is chosen freely by the playing partner is then outputted and displayed in the form of any of voice, graphics and characters or a combination of any two or more thereof.

Furthermore, according to the present invention, there is provided the method for inducing the playing partner to input required codes without knowing while causing the partner to input data indifferent from what has freely been chosen by the playing partner, the wonder of magic can be enhanced further.

Moreover, according to the present invention, there is provided the method for inducing the playing partner to input required codes without knowing by selecting keys while causing the partner to input his or her preferences which are indifferent from what is chosen by the playing partner, the wonder of magic can be enhanced further.

Furthermore, according to the present invention, there is provided the input method using graphics in which the order of depressing the buttons is controlled by the predetermined stories, whereby required information is allowed to be inputted without the playing partner being aware thereof.

Moreover, according to the present invention, since the magic games can be played using the portable telephone, the user can show the audience the magic games whenever and wherever they like.

In addition, according to the present invention, since answers to questions asked in the magic games can be transmitted in the form electronic mail to the portable telephone of the user or to portable telephones of those other than the user, more fun can be created than what is obtained by viewing what is displayed only on the screen of the portable telephone of the user.

What is claimed is:

1. A magic game system for distributing games from a web server via the internet, characterized in that a game provider provides magic games on the web server, said magic games including a choice in which what is chosen by a playing partner is guessed by a user using a portable remote information terminal, whereby the user inputs required codes from operations keys on those such as a ten key keyboard or a keyboard, the results of processing implemented in accordance with programs prepared on said server in advance are outputted and displayed as what is chosen by the playing partner in said magic games on said portable remote information terminal in the form of any of voice, graphics and characters or a combination of any two or more thereof.

2. A magic game system as set forth in claim 1, wherein in said magic games in which what is chosen by the playing partner is guessed using the portable remote information terminal what is chosen by the playing partner is defined by encoding any of kind, order and combination of data which is indifferent from what is chosen.

3. A magic game system as set forth in claim 1, wherein in said magic games in which the playing partner is asked to freely choose an answer to a predetermined question from two or more choices and to input the result of said choice from operation keys on a ten key keyboard or a keyboard, different keys corresponding to said choice to be inputted are set as keys representing the same article on the programs, so that despite the result of said choice by the playing partner only specific codes are allowed to be inputted.

4. A magic game system as set forth in claim 1, wherein buttons are disposed for two or more items displayed on a screen, whereby codes are inputted through said buttons in accordance with instructions given in predetermined stories, so that what is chosen by the playing partner can be identified.

5. A magic game system as set forth in claim 1, wherein said portable remote information terminal is a portable telephone.

6. A magic game system as set forth in claim 1, wherein an audience can receive answers to questions asked him or her in the magic games on his or her own portable remote information terminal in the form of electronic mails, or said answers can be transmitted in the form of electronic mails to portable remote information terminals of people other than said audience.

* * * * *